STANDARDS CONVERSION FOR TELEVISION SIGNALS

Filed Oct. 19, 1962 3 Sheets-Sheet 1

INVENTOR
SHIRO OKAMURA

BY Hopgood & Calimafde
ATTORNEYS

Nov. 17, 1964 SHIRO OKAMURA 3,157,738

STANDARDS CONVERSION FOR TELEVISION SIGNALS

Filed Oct. 19, 1962 3 Sheets-Sheet 2

INVENTOR.
SHIRO OKAMURA

BY Hopgood & Calimafde

ATTORNEYS

STANDARDS CONVERSION FOR TELEVISION SIGNALS

Filed Oct. 19, 1962 3 Sheets-Sheet 3

INVENTOR.
SHIRO OKAMURA
BY Hopgood & Calimafde
ATTORNEYS

United States Patent Office 3,157,738

Patented Nov. 17, 1964

3,157,738

STANDARDS CONVERSION FOR TELEVISION SIGNALS

Shiro Okamura, 2–26 Shiroganedaimachi, Shiba, Minatoku, Tokyo, Japan

Filed Oct. 19, 1962, Ser. No. 231,723
Claims priority, application Japan, Oct. 24, 1961, 36/38,341
8 Claims. (Cl. 178—6.6)

Figure 1:
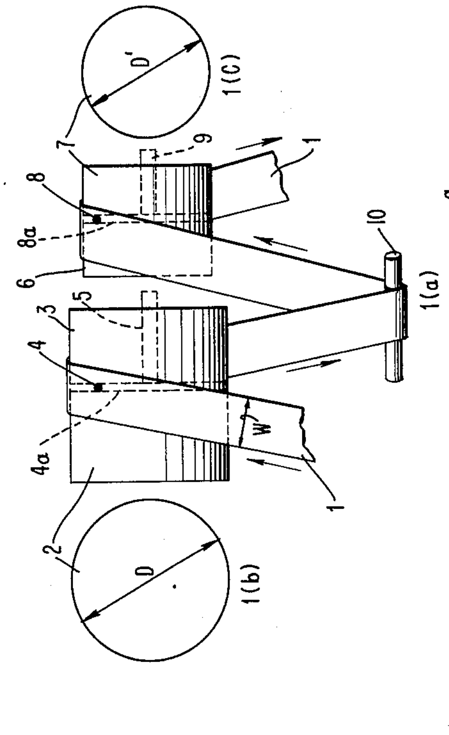

This invention relates to a converting system for a periodical signal, and particularly to a line and frame frequency converting system for a television signal.

There are many different systems used for television broadcasting in the various countries. For example the frame frequency is 30 cycles per second in the United States and Japan and 25 cycles in England and France. The number of horizontal lines per picture is 525 in the United States and Japan, 405 in England, and 625 on the Continent, with France, however, employing 819. For repeating a television program between such countries having different frame and/or line frequencies, frequency conversion must, of course, be provided.

Several systems from frame frequency conversion are known in the prior art. One of these utilizes a magnetic storage apparatus which produces recorded tracks arranged parallel to one another with each track corresponding to one frame or field. The reproducing head scans some of the recorded tracks more than once if the frame frequency is to be increased and sometimes one track is passed without scanning if the frame frequency is to be decreased. The width of the tracks is made great enough for the different rates of scanning. Such a system is also utilized in converting systems for motion picture film, e.g. to convert 24 to 16 frames, in which case some of the frames are not scanned. Such a system has the disadvantage of discontinuity of motion and is also incapable of arbitrary conversion of scanning frequency by a given single conversion unit.

For converting the line frequency, no satisfactory method has yet been developed. The technique thus far employed has been to televise a picture having a different line frequency, which inevitably results in a drop in the resolution or which results in flicker effect.

Accordingly, it is an object of this invention to provide a system for continuous conversion of the frame and line frequencies, which is capable of producing high resolution and which also allows selection of various scanning frequencies with a single apparatus.

It is another object of this inevntion to provide a system of the type described which does not produce flicker in the television picture.

A further object of this invention is to provide an apparatus capable of producing on a suitable medium a magnetized pattern which is representative of the television picture. Such an apparatus has been considered highly impractical because of the extremely high rotating head speed previously required, i.e. of the order of 15,750 revolutions per second.

According to the present invention there is provided a recording system having means for recording a periodical signal in a sequential manner in the form of a recorded track pattern, means for arranging the signal elements of said periodical signal such that corresponding elements in adjacent tracks have a certain shift in sequence with respect to each other, and means for reproducing a signal from said recorded tracks by scanning said tracks along a locus or path which is non-coincident with the tracks, and resulting in a reproduced signal having different line and/or frame frequencies from the recorded signal.

Figure 2:
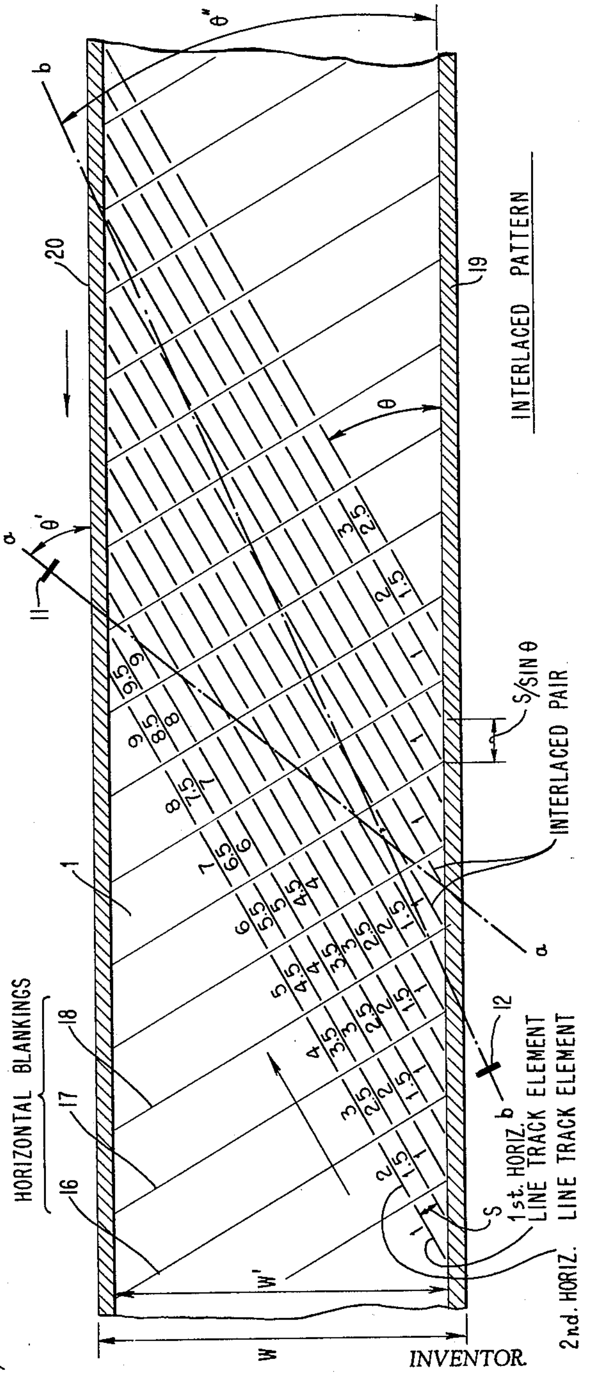
Figure 3:
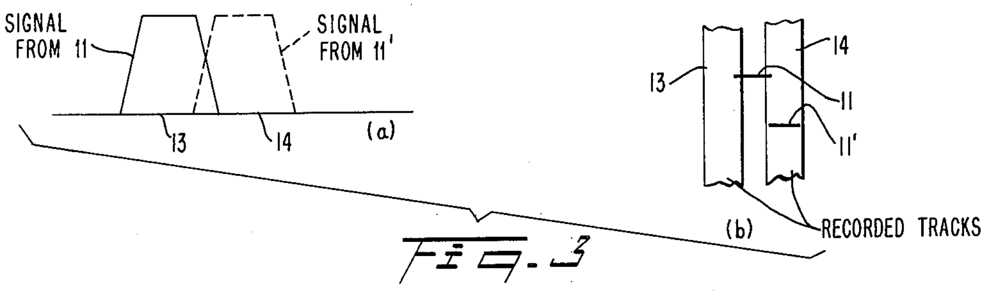
Figure 4:
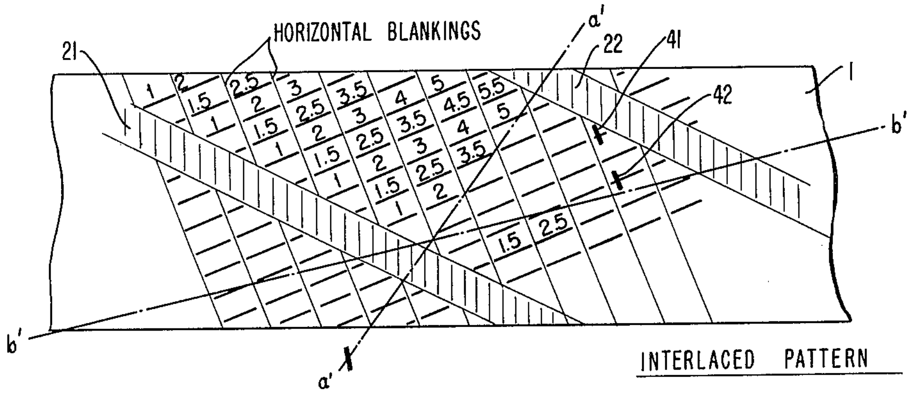
Figure 5:
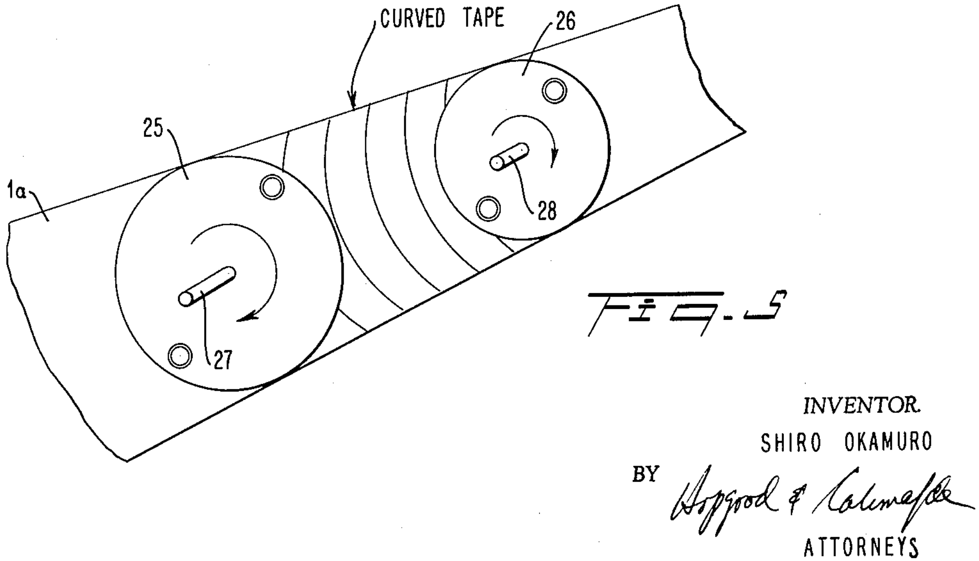
Figure 6:
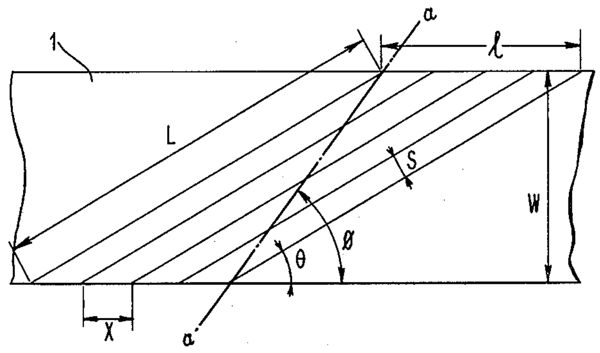
Figure 7:
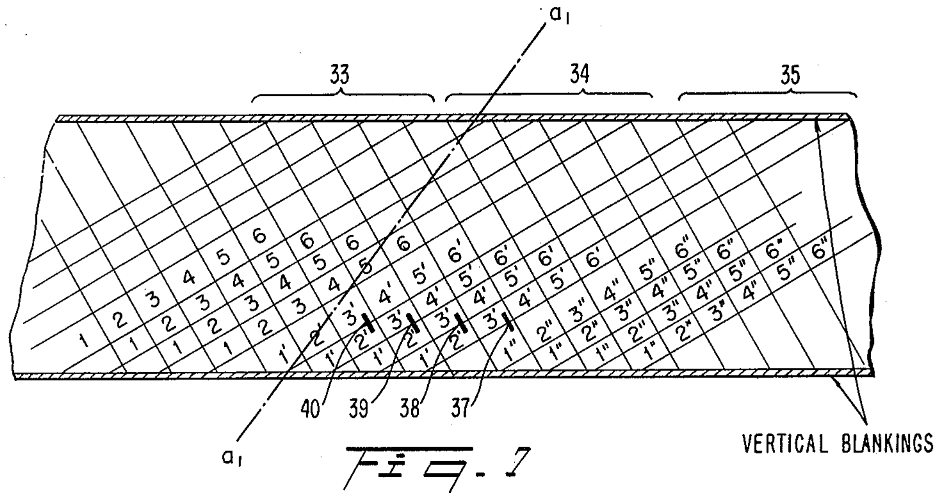
Figure 8:
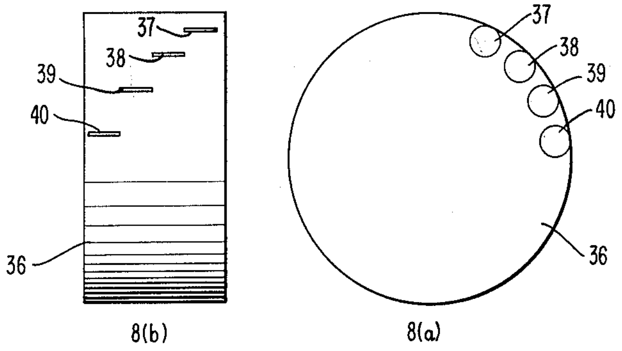

The above mentioned and other features and objects of this invention and the manner of attaining them will become more apparent and the invention itself will be best understood by reference to the following description of the invention in conjunction with the accompanying drawing, in which:

FIGURE 1(*a*) is an elevation view and FIGURES 1(*b*) and 1(*c*) are partial side views of a frame and line converting apparatus for a video signal in accordance with one embodiment of the invention, FIGURE 2 illustrates the recorded track pattern produced by the apparatus shown in FIGURE 1 and also the relation between the recording locus and the reproducing locus according to the invention, FIGURE 3(*a*) shows the relation of the recorded locus and the reproducing scanning head, and FIGURE 3(*b*) shows the manner in which the reproducing head picks up the information as an interpolation between two adjacent tracks, FIGURE 4 shows another form of recorded track pattern utilized in accordance with the present invention, FIGURE 5 illustrates a partial schematic diagram of recording apparatus in accordance with a further embodiment of the invention, FIGURE 6 is an illustration showing the relation between the recording tracks and the reproducing locus, which is useful in the calculation of the design of apparatus in accordance with the invention, FIGURE 7 shows still another form of the recorded track pattern according to the invention, and FIGURE 8(*a*) is a plan view and FIGURE 8(*b*) is a side view of a revolvable head drum employed to produce the recorded track pattern of FIGURE 7.

In FIGURE 1 there is shown a partial schematic illustration of a frame and line frequency converter according to the present invention. The numeral 1 indicates a magnetic tape which, after being wound about two fixed cylinders 2 and 3 and a guide 10, is wound about another set of two cylinders 6 and 7 which have a different diameter from that of the cylinders 2 and 3. If desired, the cylinders 2 and 3 may be in the form of a single cylinder; the same is true for the cylinders 6 and 7. The translation of the tape is accomplished by suitable known means such as a supply reel, capstan and take up reel, not shown. It is well known that such an apparatus is capable of producing a recorded track pattern in which the tracks are arranged parallel one after another and disposed in oblique relationship to the longitudinal direction of the tape by means of suitable rotating magnetic heads. In this invention there is provided a magnetic recording head 4 and a magnetic reproducing head 8, their paths of rotation being depicted respectively, by the lines 4*a* and 8*a*. The number of rotating magnetic recording heads may be arbitrarily chosen; for a two head system the tape should be wound approximately 180 degrees around the cylinders and for a single rotating head system it should be wound approximately 360 degrees.

For simplicity let us next consider only the case of the single head system. In such a system let the following letters represent as indicated:

$W$—width of the tape
$D$—diameter of the cylinder
$\Theta$—inclination angle of the track to the longitudinal tape direction
$V$—velocity of translation of the tape
$s$—pitch of the recorded track
$n$—rotational speed of the head Referring now to FIGURE 6, the next relation is derived for the single head system:

$$\pi D \sin \Theta = W,\ V = nx = ns/\sin \Theta \quad (1)$$

From this formula, it will be seen that the inclination angle $\Theta$ is determined by the choice of the values of W and D.

FIGURE 2 illustrates the recording track pattern produced by the apparatus shown in FIGURE 1. In this case the revolution of the recording head is synchronized with the vertical scanning frequency, and phase of the rotation is controlled so that the vertical blanking portions lie at the edges of the tape. In the two head system the diameter D may be doubled and the head speed may be halved. If one recorded track corresponds to one frame, the relation between adjacent horizontal line loci is $$s=vH \tan \Theta \quad (2)$$

where H is the length of one horizontal line and $v=0, 1, 2 \ldots$, and indicates the amount of shift of sequential numbers between the adjacent tracks. If, however, one recorded track corresponds to one field, the relation for the adjacent horizontal line locus is $$s=(2v+1)\frac{H}{2} \tan \Theta \quad (3)$$

FIGURE 2 corresponds to this latter case where one track corresponds to one field, and an interlaced pattern therefore is illustrated. The series of numerals adjacent the track elements indicates the sequential number of the horizontal line in the picture frame. In the figure only 9.5 lines per field are shown for simplicity. Actually, the number of lines should be 525/2 for a field, including the vertical blanking portion. If the relation between the width of the recording tracks 13 and 14 and the gap length of the reproducing head is such that the output of the head is substantially constant, see FIGURES 3*a* and 3*b*, throughout all positions between perfect tracking and perfect mistracking as shown by the numerals 11 and 11' in FIGURE 3*b*, widely differing rates of scanning for reproducing can be employed without significant drop in the resolution and without flicker. This is achieved because, by the arrangement of the adjacent tracks as shown in FIGURE 2, the interpolated signal reproduced from both tracks by a reproducing head is the interpolated information of two fields.

If both the recording and the reproduction are performed by the same apparatus as, for example, 2, 3 and 4 shown in FIGURE 1, the reproducing locus may be nearly parallel to that of recording though the scanning speed varies somewhat, i.e. the number of the lines reproduced by the head is substantially unchanged.

However, if the reproduction is performed by a different apparatus as, for example, that indicated by the numerals 6, 7 and 8 in FIGURE 1, having different cylinder diameters, the reproducing tracks will have a different inclination as shown by the line *aa* or *bb* and the angle $\Theta'$ or $\Theta''$ in FIGURE 2. Such reproduction produces a different number of lines through one scanning period of the rotating head. Accordingly, the number of lines can be increased or decreased without considerable drop in the resolution and substantially without flicker, if the above mentioned interpolating conditions are met. In such case the locus or path of the reproducing head 11 may have an inclination angle $\Theta'$ as seen in FIGURE 2. The required inclination angle $\Theta'$ of the reproducing locus *aa* can be calculated from the above Equation 1, substituting D' instead of D. In FIGURE 2 the number of horizontal lines is decreased by 3 lines so that the original 9.5 lines is reduced to 6.5 lines.

Referring now to FIGURE 6, which illustrates the relation of the inclination of recording and reproducing loci, the angle of inclination of the reproducing locus *aa* is:

$$\phi=\cot^{-1}\frac{L \cos \Theta - l}{W} \quad (4)$$

where $l=sN/\sin \Theta$, and $N$=the number of horizontal lines to be decreased (if the number is to be increased, N becomes negative).

Substituting $\phi$ into $\Theta$ in Equation 1 yields the diameter D for the cylinders 6 and 7. From the foregoing it is apparent that the number of lines to be decreased or increased is arbitrarily chosen according to the Formula 4 above. If now, in FIGURE 2, the reproducing locus is represented by the line *bb* as shown, the number of lines will increase to 11.5. In order that interlacing be achieved on the reproduced picture, the beginning and end of the recorded tracks may be placed in either the odd or even fields.

The frame frequency of reproduction can be arbitrarily chosen by the rotating speed or frequency of the reproducing head. Although this rotating frequency has very little effect in the number of lines, because the practical vertical frequencies do not differ much, for accurate calculation some correction should be introduced into Formula 3 above.

As described above the apparatus according to the invention enables arbitrary conversion of the line and the frame frequency substantially independently. If the frame frequency is unchanged, the two rotating shafts 5 and 6 of FIGURE 1 can be directly connected.

In the embodiment of the invention described above the vertical blanking signal portions 19, 20 are produced at the edges of the tape. This technique eliminates the effect of discontinuity which results if the vertical blanking strips are positioned at an angle to the longitudinal direction of the tape. In some cases, however, it is useful to use the recorded pattern as shown in FIGURE 4, in which the vertical blanking portions 21, 22 lie positioned at such angle. Moreover, the head need not necessarily be locked to the vertical frequency during rotation. If, in this case, the head is rotated at a rotating frequency reduced from the vertical frequency by an amount of approximately $$100\frac{vH}{\pi D}\%$$

the horizontal blanking portion comes to the edges of the tape and the discontinuity is reduced. Also a reproducing head having a wide gap can substantially reduce the discontinuity. Further two heads such as 41 and 42 in FIGURE 4 having separate gaps may be used for reproducing, these heads being switched in a suitable manner before each head tracks the edges of the tape. Such heads can be employed in the case of FIG. 2.

Such a recorded pattern as that of FIGURE 4 can also be produced by the mechanism arrangement shown in FIGURE 1. Such a pattern provides several advantages, i.e. the tape width and the space between the tracks can be arbitrarily selected. The reproducing locus along the line *a'a'* makes the number of lines decrease, and reproducing along the line *b'b'* makes it increase.

The recorded track according to the present invention should be arranged as correctly as possible to the end that as little jitter as possible be developed. Variable delay means controlled by an error signal derived from the reproduced signal synchronized with rotation and a signal from a ringing circuit may be employed for compensation of any jitter that is present. Another method which can be employed is to first record the common horizontal synchronizing signal as at 16, 17 and 18 on the tape of FIGURE 2 by means of a fixed head having a long gap of the length of the lines 16, 17 and 18, i.e., a gap equal to W/cos $\Theta$. Then on the recording, the scanning head picks up the recorded horizontal pulse which drives the television camera. The video signal thus produced has the recorded pattern on the tape which is recorded as described above. This video signal is directly recorded just on or near the position at which the synchronizing pulse is picked up, either via the same head which reproduces the synchronizing pulse or via another recording head placed near the reproducing head for the synchronizing pulse. It will be apparent that the same method can be applied to the case of FIGURE 4. The method for producing exactly spaced horizontal pulse loci as 16, 17 and 18 is to employ two or more heads which are disposed in exact proper relationship. If the preceding head picks up a pulse and feeds its output to the next head or to the recording head, the produced track has accurate pitch independent of the spurious variation of the translation velocity of the tape.

The following example is presented as a practical design (refer to FIGURES 1 and 2):

Form of recorder: Two head system (see FIGURE 1)
Tape width $W=2''$ (51 mm.), $W'=1.86''$ (46.6 mm.) (actual effective width excluding the space for the voice track, etc.)
$H=0.095''$ (2.4 mm.)
$v=1$ therefore $2v+1=3.0$—this being the difference between the adjacent tracks, which may be permissible on the interpolation in order to retain fairly good resolution.
$D=17.4$ (436 mm.)
$\Theta=\sin^{-1}\pi D/W=4.13$ degrees (from Equation 1)
$s=0.014''$ (0.26 mm.) (from Equation 2)
$n=30$ r.p.s.
$L$ (the length of 1 track) $=(\pi/2)D=27.2''$ (694 mm.)
$V=8.6''$ (211 mm.)

The above figures are computed on the basis of the television standards of the United States. Now the video signal will be converted to the British standard, i.e. 25 frames per sec. and 405 lines per frame.

$\phi=7.3$ degrees (Formula 3)
$l=12.8''$ (324 mm.)
$D'=W/\pi \sin \Theta=9.3''$ (1) (234 mm.)
$n'=25$ r.p.s.

The angle of inclination $\Theta$ of the reproducing head may be 4.13 degrees. It is apparent that the above data are quite feasible, necessitating only slight modifications to the usual video tape recorder. The frame frequency is of course arbitrarily set by merely varying the rotating velocity of the head. In the case of a single head system, the diameter D may be halved and the head speed $n$ may be doubled. If desired, an endless tape may be employed for continuous operation.

The line converting system as described above suffers from image distortion when the movement of the image is vary rapid. This is due to the difference of time on the upper and lower portions of the picture frame, as is apparent in FIGURE 2. This can be avoided by the arrangement shown in FIGURE 7. As can be seen, each field is recorded, being divided by several numbers of tracks shifted sequentially by a certain amount. The numerals 33, 34 and 35 each designate a field, and each field comprises four separate tracks. Such recording tracks can be produced by means of a rotating head assembly as shown in FIGURE 8. A plural number of heads, for example, the four heads 37, 38, 39 and 40 are properly positioned on a drum 36 and are excited simultaneously. The locus of the reproducing head may be $a_1a_1$ as shown in FIGURE 7, which is within the set of tracks corresponding to one field, i.e., the field 34. In some cases the path or locus $a_1a_1$ may cover a number of tracks corresponding to several frames if some distortion is allowable, that is, a slight deviation of time between the upper and lower end of the picture may be permissible just as in the case of the focal plane shutter of an optical camera.

The line frequency and frame frequency conversion may if desired, also be performed by different sets of converters.

The factor $v$ relates to the correlation between the adjacent tracks. The larger the $v$ becomes, the smaller becomes the correlation for the constant pitch of the recorded tracks, however, a larger $v$ also allows a smaller angle and therefore a smaller tape width W for a given cylinder diameter D. The value of D determines the length of one track and therefore the resolution of the apparatus. Accordingly, a narrower tape can be employed if the value $v$ is large.

The recording apparatus employed in accordance with this invention is not limited to that described above, but various other types of recorders can also be employed. Generally, recording tracks arranged substantially parallel one after another and having the sequence slightly shifted sequentially on adjacent tracks are useful. Moreover, the locus of the reproducing head must have a different length compared with that of the recording tracks. For example, the cylinders 2, 3, 6 and 7 may have elliptical cross sections and the axis of the rotating head may be skewed. The locus is sinusoidal in this case. The tape may be translated flat and the head, mounted on an endless belt-conveyor, may scan the tape. Also a curved broad tape 1a may be transversely scanned as shown in FIGURE 5. Further, the axes 27 and 28 of the rotating heads may be skewed with respect to each other. Also, various types of recording medium, e.g. disc, drum, pulley, etc., may be employed. Further, arc form or spiral form tracks can be employed.

Reproduction need not necessarily be carried out with the same velocity as recording. Slow, quick or still motion is possible by merely changing the translation velocity of the recording medium. Therefore it is possible to produce, e.g., a slow motion recorded signal having different line and/or frame frequencies. The slow motion may be compensated for by a faster playback speed, which would then reproduce the original signal at its natural speed. For playback at different speeds from recording, it may be desirable or necessary to employ more than two sets of record/reproduce equipment. Alternatively, a travelling rotating head being translated opposite to the direction of the tape may be useful. The slow, quick or still motion may be exhibited by a monochromatic image in the color system. In carrying out such slow, quick and still motion the number of lines in the reproduced picture may, of course, differ by some amount from the original picture.

The frame converting system of this invention is performed in a manner such that the rotating velocity of the reproducing head is altered. Referring again to FIGURE 2, it will be understood that slow reproduction scanning by the head 12 yields a locus such as that indicated by the line $bb$. Therefore a single reproduced field contains more lines than that recorded field. However, the decreased frame frequency must be increased generally by suitable apparatus, such as by the apparatus according to this invention; that is, reproduction along the recorded locus as shown in FIGURE 2, with the rotating reproducing head having the same diameter as that for recording.

It should be observed that a magnetized image of the television picture signal is formed between the lines such as 17 and 18 in FIGURE 2, though the upper and lower parts of the picture differ in time. The magnetized image can be developed visually in accordance with known techniques, such as the emulsion of carbonyl iron powder. Otherwise the magnetic image can be visualized by means of rotation of polarized light by residual magnetism which is passed through a suitable polarizing plate. If the factor $v$ is large, the resolution of the image may be low, but it may be useful as a monitor for the picture. Also, direct reproduction of the image from the recorded track is possible. For only visualizing purposes, one full frame or field need not be recorded, but only that portion requiring one picture frame. For such purposes a rotating head having a large diameter may be employed in conjunction with portions of apparatus thus far described. Thus developing, fixing, copying, enlarging, varying of the ratio of length to breadth, etc., are possible optically or electromagnetically, and permanent storing of the picture is achieved.

The sequential pictures formed as above described resemble a picture series such as is employed in motion pictures, and accordingly it is possible to project or observe it as a motion picture with intermittent movement.

The system and apparatus according to the present invention has rather simple construction and in a simple manner it enables line and frame conversion of the television images and the like without degradation or drop of the resolution and without flicker. It is also applicable to radar images, PTM systems, and electromedical purposes such as for the viewing of pulsation signals, etc.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A video signal recording and reproducing system comprising a first curved member and a second curved member positioned in spaced relation thereto, a flexible elongated strip adapted to be passed consecutively over the surface of each of said members, said strip containing a film of magnetically sensitive material, means for moving said strip in the direction of its longitudinal axis, magnetic field producing means adapted to scan said strip at a given rate in the region of said first member to thereby produce a recorded video signal pattern on said strip in accordance with signal information applied to said magnetic field producing means, and signal reproducing means for scanning said strip in the region of said second member at a rate different from said given rate to thereby produce a replica of said video signal, said replica being characterized by having a frame frequency different from that of said recorded video signal.

2. The invention described in claim 1 wherein said recorded pattern comprises a plurality of rows of tracks, each track having a series of line elements arranged sequentially one after another, said elements being shifted in time sequence with respect to corresponding elements of adjacent tracks.

3. A video signal recording and reproducing system comprising first cylinder means and second cylinder means positioned in spaced relation thereto, said second cylinder means having a different diameter than said first cylinder means, a flexible elongated strip adapted to be passed consecutively over the surface of each of said cylinder means, said strip containing a film of magnetically sensitive material, means for moving said strip in the direction of its longitudinal axis, magnetic field producing means adapted to scan said strip in the region of said first cylinder means to thereby produce a recorded video signal pattern on said strip in accordance with signal information applied to said magnetic field producing means, and signal reproducing means for scanning said strip in the region of said second cylinder means to thereby produce a replica of said video signal having a line frequency different from that of said recorded video signal.

4. A video signal recording and reproducing system comprising a first curved member and a second curved member positioned in spaced relation thereto, a flexible elongated strip adapted to be passed consecutively over the surface of each of said members, said strip containing a film of magnetically sensitive material, means for moving said strip in the direction of its longitudinal axis, a magnetic recording head adapted to scan said strip at a given rate in the region of said first member to thereby produce a recorded video signal pattern on said strip in accordance with signal information applied to said head, and a reproducing head in the region of said second member for scanning said strip at a different rate than said recording head to thereby reproduce said video signal in accordance with the information imparted to said magnetic pattern, said reproduced video signal being characterized by having a frame frequency different from the frame frequency of said recorded video signal.

5. A video signal recording and reproducing system comprising a first cylinder and a second cylinder positioned in spaced relation thereto, said cylinders having different diameters, a magnetic tape and means for passing said magnetic tape in a skewed manner over the surface of each of said cylinders, a magnetic recording head rotatably mounted for scanning said tape in a skewed manner in the region of said first cylinder to produce a recorded video signal pattern on said tape, and a magnetic reproducing head rotatably mounted for scanning said magnetic tape in a skewed manner in the region of said second cylinder to produce a replica of said video signal which has a line frequency different from that of said recorded signal.

6. The invention described in claim 5 wherein said pattern comprises a plurality of parallel rows of tracks disposed at an angle to the longitudinal axis of the tape, each track having a series of line elements arranged sequentially one after another, said elements being shifted in time sequence with respect to corresponding elements of adjacent rows.

7. The invention described in claim 5 wherein the locus of said reproducing head with said tape is non-coincident with the locus of said recording head with said tape so that the intersection of said reproducing head with said pattern of recorded tracks causes a different number of signal line elements to be reproduced than are present in said recorded signal.

8. A video signal recording and reproducing system comprising a first cylinder and a second cylinder positioned in spaced relation thereto, a magnetic tape and means for passing said tape consecutively over the surface of each of said cylinders, a magnetic recording head rotatably mounted for scanning said tape at a given rate in the region of said first cylinder to produce a recorded video signal pattern on said tape, and a magnetic reproducing head rotatably mounted for scanning said tape in the region of said second cylinder at a rate different from said given rate to reproduce said video signal at a frame frequency different from that of said recorded signal.

References Cited in the file of this patent

UNITED STATES PATENTS

| | | |
|---|---|---|
| 2,965,708 | Witt | Dec. 20, 1960 |
| 3,099,708 | Smith | July 30, 1963 |